United States Patent [19]

Yoder

[11] Patent Number: 4,736,708

[45] Date of Patent: Apr. 12, 1988

[54] PORTABLE HABITAT AND HAVESTING APPARATUS FOR STONE CRABS, LOBSTER AND CRAYFISH

[76] Inventor: Daniel C. Yoder, 809 Bokhara Pl., Sarasota, Fla. 33582

[21] Appl. No.: 928,891

[22] Filed: Nov. 10, 1986

[51] Int. Cl.⁴ .............................................. A01K 61/00
[52] U.S. Cl. ............................................ 119/2; 119/3
[58] Field of Search .................... 119/2, 3, 4; 405/28, 405/35, 21; 43/43.14, 44.89, 44.9, 44.96, 44.97

[56] References Cited

U.S. PATENT DOCUMENTS

| | | | |
|---|---|---|---|
| 954,283 | 4/1910 | Hawkes | 405/21 |
| 1,023,676 | 4/1912 | Pancoast | 43/43.14 |
| 2,742,731 | 4/1956 | Lovelace | 43/44.9 X |
| 3,608,230 | 9/1971 | Hribar | 43/44.89 |
| 3,852,906 | 12/1974 | LaForce | 43/44.97 X |
| 4,086,719 | 5/1978 | Robbins | 43/44.9 |
| 4,095,560 | 6/1978 | Laurie et al. | 119/3 |

Primary Examiner—Robert P. Swiatek
Assistant Examiner—Mary McNeil
Attorney, Agent, or Firm—Charles J. Prescott

[57] ABSTRACT

A portable habitat and harvesting apparatus for marine life such as stone crab, crayfish, lobster and the like deployable on the water bottom and comprising a length of flexible cord connectable at each end to a separate end weight. A plurality of hollow containers are also included, each having an opening and connectable to and along the length of the cord. The invention is deployable on the water bottom in large quantities from a small boat, facilitated by the simplicity and compactness of its components which are easily assemblable during deployment. The invention may also include one or more midweights each positioned between adjacent containers along the cord to assist in maintaining the containers against the water bottom and in an orientation wherein the container interior is generally horizontally disposed in relation to its opening.

14 Claims, 1 Drawing Sheet

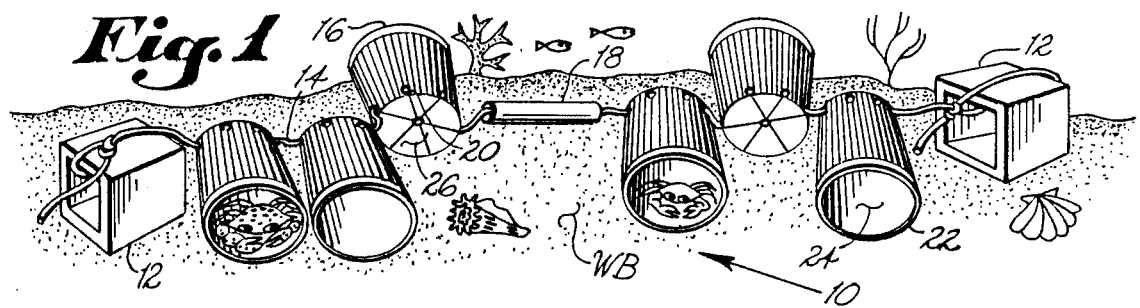
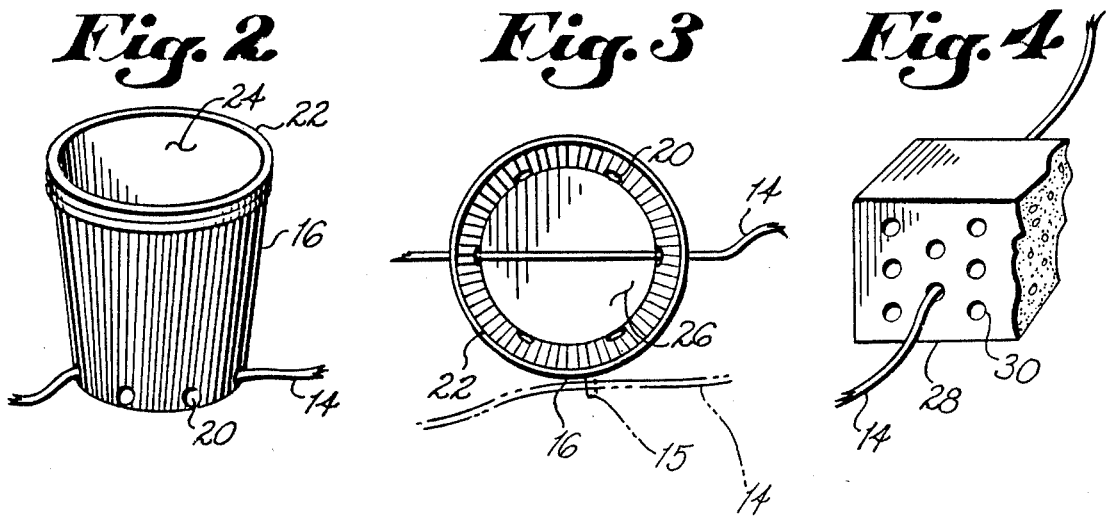
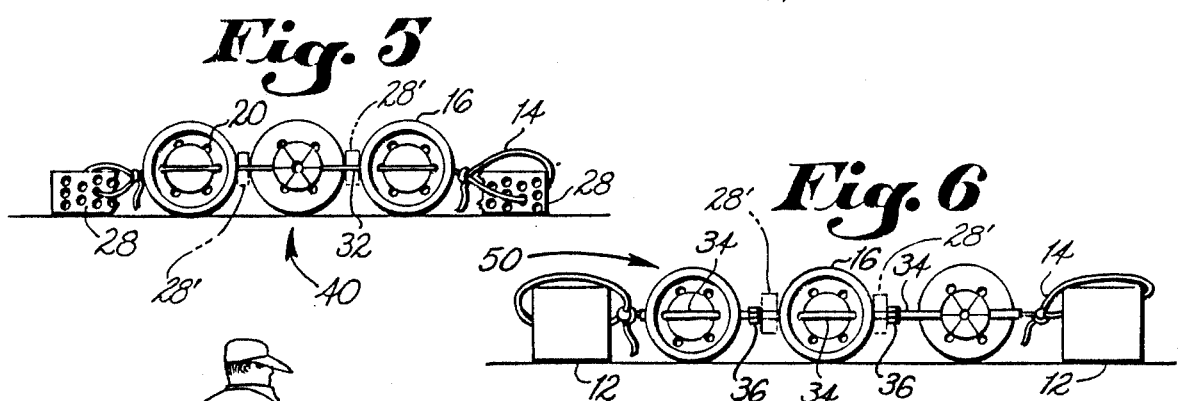
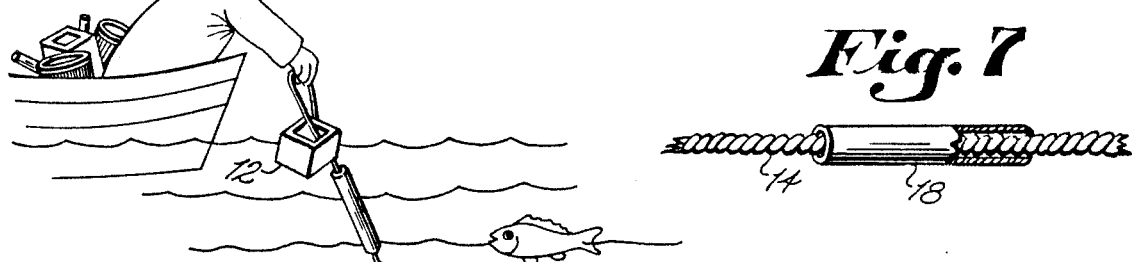
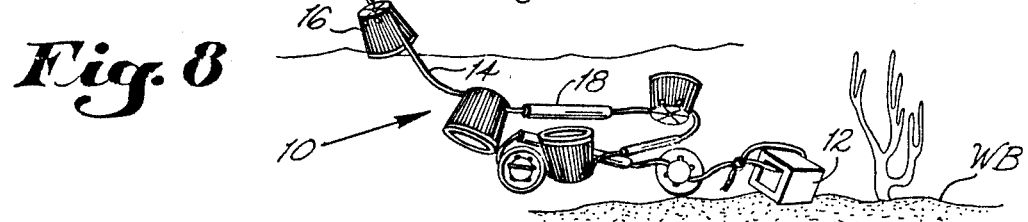

PORTABLE HABITAT AND HAVESTING APPARATUS FOR STONE CRABS, LOBSTER AND CRAYFISH

BACKGROUND OF THE INVENTION

This invention relates generally to artificial reefs and habitats for, and the harvesting of, marine life, and more particularly to a portable apparatus for sheltering and harvesting stone crabs, lobster, crayfish and the like.

Providing a marine habitat to nurture and support the increased colonization and growth of crustaceans and the like has been given considerable and extensive attention by a great many people in the past. Prior art includes many structures and apparatus which, to varying degrees of effectiveness and economy, facilitate and enhance the productivity in harvesting such marine life. The apparatus disclosed in U.S. Pat. No. 4,449,479 to Saucier comprises a submersible hollow dome-shaped structure having at least one opening in its sidewall to allow crayfish to pass therethrough. This apparatus is intended to facilitate both harvesting and sheltering of crayfish. U.S. Pat. No. 3,741,159 to Halaunbrenner discloses a float-equipped cage for shellfish having a basket-like receptacle which incorporates a float and means for attaching an anchor and interconnecting line so as to maintain the invention at a position intermediate the water surface and bottom. The device disclosed in U.S. Pat. No. 3,858,554 to Beaupoil et al. is directed to structure for protecting individual lobsters or similar crustaceans during their growth period.

Clearly one of the major drawbacks to the number of deployed artificial reefs is the challenge of transporting same to the deployment site. It is here that great expense is incurred with respect to most larger reef deployment projects. Despite the acknowledged difficulty of deploying larger artificial reefs, there is a general consensus among researchers that artificial reefs can actually be used to substantially increase total biomass of marine organisims in a local area. Of course, these reefs are not only to serve as habitat, but may also serve as a harvesting site by the enhancement and concentration of populations of marine life.

Another form of artificial habitat known to applicant is in the form of a plastic netting filled with oyster shell and tied into a ball by a length of cord which is attached to the upper portion of a pole near the water's surface such that the filled netting lays on the water bottom and is held there.

With regard, particularly to stone crabs which are found primarily in South Florida waters, it has been observed that stone crabs occupy horizontal holes at a substrate level significantly more often than other configurations. Even where concrete blocks by themselves have been used on barren sand and broken shell bottom in waters 10 to 12 feet deep, rapid colonization of the reefs have occurred despite their relative distance from other natural reefs.

The present invention provides a portable sheltering and harvesting apparatus for stone crabs, lobster, crayfish and other crustaceans, which is easy and convenient to convey to a particular desired site and easily assemblable and deployable by a single individual from a relatively small boat. The invention is quite economical to prepare and deploy in that it may be constructed utilizing conventional existing components in a novel arrangement which provides the necessary interior configurations to attract this marine life.

BRIEF DESCRIPTION OF THE INVENTION

This invention is directed to a portable habitat and harvesting apparatus for marine life such as stone crab, crayfish, lobster and the like comprising a length of flexible cord connectable at each end to a separate end weight. A plurality of hollow containers are also included, each having an opening and connectable to and along the length of the cord. The invention is deployable on the water bottom in large quantities from a small boat, facilitated by the similicity and compactness of its components which are easily assemblable during deployment. The invention may also include one or more midweights positioned between adjacent containers along the cord to assist in maintaining the containers against the water bottom and in an orientation wherein the container interior is generally horizontally disposed in relation to its opening.

It is therefore an object of this invention to provide a portable sheltering and harvesting apparatus for crustaceans such as lobsters, stone crabs, crayfish and the like which is easily deployable in large numbers from small vessels.

It is another object of this invention to provide a portable sheltering and harvesting apparatus for crustaceans such as lobsters, stone crabs, crayfish and the like which is economical to produce in that several inexpensive commercially available components are utilized therein.

It is another object of this invention to provide a portable sheltering and harvesting apparatus which, because of the above features, may be utilized by individuals and small companies and, thus, will enhance the marine life population it is intended for and in areas which may otherwise go unnurtured.

In accordance with these and other objects which will become apparent hereinafter, the instant invention will now be described with reference to the accompanying drawings in which:

BRIEF DESCRIPTION OF THE DRAWINGS

FIG. 1 is a perspective view of the preferred embodiment of the invention deployed on the water bottom.

FIG. 2 is a perspective view of a portion of the invention showing one of its containers and cord passed therethrough.

FIG. 3 is a top plan view of FIG. 2.

FIG. 4 is a perspective view of one embodiment of the mid-weight of the invention.

FIG. 5 is a side elevation view of another embodiment of the invention.

FIG. 6 is a side elevation view of another embodiment of the invention.

FIG. 7 is a partially broken side elevation view of another embodiment of the mid-weight of the invention.

FIG. 8 is a perspective view showing the deployment of the preferred embodiment of the invention.

DETAILED DESCRIPTION OF THE INVENTION

Referring now to the drawings, and particularly to FIGS. 1, 2, 3 and 7, the preferred embodiment of the invention is shown generally at numeral 10 and includes an elongated length of flexible cord 14 connected at each end to an end weight 12. The preferred embodiment of the end weight 12 is in the form of all or a portion of a typical cinder block used in building construction.

Disposed along the length of the flexible cord 14 are a plurality of containers 16 and a mid-weight 18. The preferred embodiment of the container 16, as best seen in FIGS. 2 and 3, is a conventional thin-walled plastic pot as used by nurseries and the like. At least two opposing apertures 20 are placed through the walls of the container 16 such that the cord 14 may be passed therethrough. The apertures 20 are disposed adjacent the bottom 26 of the container 16 as shown. Alternately, as shown in phantom in FIGS. 2 and 3, at least one eyelet 15 attached or integral to the exterior surface of the container 16 may be provided, each eyelet 15 having an aperture for receiving the cord 14 passed therethrough as shown.

The container 16 with its end margin 22 forming opening 24 is adapted, in conjunction with the invention 10, to naturally position itself horizontally such that the opening 24 provides a generally upright opening for ease of ingress and egress for the marine life into in the interior 24 of the container 16 as best seen in FIG. 1. This container 16 as the preferred embodiment, takes advantage of the natural tendencies, particularly of stone crabs and other crustaceans, to favor a habitat which is generally horizontal in shape and having a closed end, here the bottom 26 of the container 16. Although not required, the invention 10 as the preferred embodiment also includes a mid-weight 18 in the form of a short length of tubing made of heavy or dense material. This embodiment of the mid-weight 18 is best seen in FIG. 7 and is adapted in size to permit the flexible cord 14 to be threadably disposed therethrough during deployment.

Referring now to FIG. 4, an alternate embodiment of either the mid or the end weight is shown generally at 28 and is in the form of all, or a portion of, a conventional brick used in construction having a plurality of apertures 30 disposed therethrough, normally placed there for weight and material reduction. However, this structure lends itself conveniently to be incorporated into either an end or mid weight as a convenient and inexpensive element of the invention 10.

It should be clear by now that one feature of the invention resides in its smiplicity and inexpensiveness to fabricate. The materials preferred are inexpensive and convenient to obtain and, further, may be easily stored, even on small boats, in order to be conveyed to a site of deployment on the water bottom WB.

Referring now to FIG. 5, an alternate embodiment of the invention is shown generally at 40 having end weights 28 as shown in FIG. 4, and a plurality of containers 16 disposed along the length of flexible cord 14. However, this embodiment 40 also includes a length of relatively rigid tubing 32 disposed over the cord 14 and also through the apertures 20 in container 16. This embodiment 40, which rigidizes the flexible cord 14 disposed through the tubing 32 into a bar or rod, is intended to facilitate the even dispersion of the containers 16 and end weights 28 during employment.

Another embodiment of the invention is shown in FIG. 6 generally at 50 and is intended to function similarly to the embodiment 40 in FIG. 5. However, the elongated bar is fabricated of a plurality of tubing segments 34 with couplings 36 therebetween. This embodiment 50 is somewhat easier to deploy, while maintaining the features as in FIG. 5 of the elongated bar spanning between and spacing end weights 12 apart. Alternately, couplings 36 may be omitted to allow relative angular movement between the tubing segments. In both embodiments 40 and 50 shown in FIGS. 5 and 6, the preferred form of these relatively rigid tubular segments 32 and 34 is PVC tubing. Although not required, at least one mid weight in the form of the apertured brick shown in phantom in both FIGS. 5 and 6 at 28' may be included to function as previously described. The apertures in brick 28' are sized somewhat larger to receive a tubing segment 32 or 34 passed therethrough.

Referring lastly to FIG. 8, deployment of the preferred embodiment of the invention 10 is depicted therein. Generally, to effect deployment, the user simply attaches one end of the flexible cord 14 to an end weight 12, then feeds the flexible cord 14 through the apertures 20 in a plurality of containers 16, intermittently also including mid-weights 18 thereon. Finally the other end of the flexible cord 14 is attached to another end weight 12. Thereafter, one end weight 12 is tossed overboard and, at the appropriate moment, the other end weight 12 is released by the user in order to accomplish a spaced apart relationship between the two end weights 12 and to provide an elongated array with respect to the containers 16.

Again, to reiterate, a primary feature of this invention is to provide a habitat and harvesting apparatus for crustaceans and the like, particularly lobster, crayfish and stone crab, which is easily deployable from small vessels, as well as larger commercial vessels. The containers 16 chosen in the preferred embodiment 10 are stackable and formed of lightweight, thin walled, plastic material so that a large number may be conveniently carried to the deployment sites per trip. Additionally, the flexible cord 14 is easily coilable or cut into segments from a larger reel as each is asembled. The end weights 12 are, preferrably of cinder block used in construction and are convenient to stack and deploy. All elements of this invention are inexpensive and, where not recoverable, do not represent a large investment by the user.

In use, the containers 16, lying preferrably on their side, aided by tide and currents, provide both a protective habitat and a convenient harvesting means for the user who is aware of each deployment location or the location of a bed deployed comprising a plurality of such apparatus disposed in an array.

Although the preferred embodiment of the shape of the container is set forth above and in the figures, it should be noted that the shape of the container also may be conical or truncated conical or the like while remaining within the scope of this invention. Additionally, it should be noted that, although the preferred embodiment for the deployment of the invention includes an end weight at either end, this arrangement may be extended in multiples whereby a larger end weight becomes a mid weight while still remaining within the scope of the invention.

While the instant invention is shown and described herein in what is conceived to be the most practical and preferred embodiment, it is recognized that departures may be made therefrom within the scope of this invention, which is therefore not to be limited to the details disclosed herein, but is to be accorded the full scope of the claims so as to embrace any and all equivalent apparatus and articles.

What is claimed is:

1. An apparatus positionable on the water bottom for providing a portable underwater habitat for marine life such as crustaceans and the like comprising:
   a length of flexible cord connectable at each end to a separate end weight;
   a plurality of hollow relatively thin walled containers each having an interior and an exterior and an opening for allowing marine life to enter and exit said container interior;
   means for attaching said containers to said cord in spaced relation between said end weights, said containers being relatively thin walled pots each having a bottom and continuous side wall; the distal edge margin of said side wall extending from said bottom and defining said opening.

2. An apparatus as set forth in claim 1, further comprising:
   a plurality of rigid unconnected slender elongated tubular conduits disposed over substantially the entire length of said cord between said end weights;
   said conduits for assisting in depositing said apparatus on the water bottom in a more fully extended arrangement wherein said end weights are spaced a maximum distance apart.

3. An apparatus as set forth in claim 2, wherein:
   said containers are relatively thin walled pots each having a bottom and continuous side wall.

4. An apparatus as set forth in claim 3, wherein:
   said attaching means is at least two opposing apertures disposed through each said container side wall adjacent said container bottom;
   said apertures adapted to have said cord passed therethrough.

5. An apparatus as set forth in claim 1, further comprising:
   at least one mid weight spaced along said cord between two adjacent said containers for assisting in maintaining said containers against the water bottom.

6. An apparatus as set forth in claim 5, wherein:
   said mid weight is a portion of a brick having holes disposed therethrough;
   said brick holes adapted to receive said cord passed through at least one of said brick holes.

7. An apparatus as set forth in claim 5, wherein: said at least one mid weight is a relatively heavy length of tubing adapted to have said cord pass therethrough.

8. An apparatus as set forth in claim 1, wherein:
   said attaching means is at least two opposing apertures disposed through each said container side wall adjacent said container bottom;
   said apertures adapted to have said cord passed therethrough.

9. An apparatus as set forth in claim 1, wherein:
   said attaching means is at least one eyelet connected to each said container outer surface;
   said at least one eyelet adapted to have said cord passed therethrough.

10. An apparatus positionable on the water bottom for providing a portable underwater habitat for marine life such as crustaceans and the like comprising:
    a plurality of rigid connectable slender elongated tubular conduits collectively forming a relatively rigid bar connectable at each end to a separate end weight by a length of flexible cord longer than said bar and disposed therethrough;
    a plurality of hollow relatively thin-wall containers each having an interior and exterior and an opening for allowing marine life to enter and exit said container interior;
    means for attaching said containers to said bar in spaced relation between said end weights.

11. An apparatus as set forth in claim 10, further comprising:
    at least one mid weight spaced along said bar between two adjacent said containers for assisting in maintaining said containers against the water bottom.

12. An apparatus as set forth in claim 11, wherein:
    said at least one mid weight is a portion of a brick having holes disposed therethrough;
    said brick holes adapted to receive said bar passed through at least one of said brick holes.

13. An apparatus as set forth in claim 11, wherein:
    said at least one mid weight is a relatively heavy length of tubing adapted to have said bar pass therethrough.

14. An apparatus as set forth in claim 11, wherein:
    said attaching means is at least one eyelet connected to each said container exterior;
    each said at least one eyelet adapted to have said bar passed therethrough.

* * * * *